United States Patent [19]

Volakakis

[11] 4,353,700
[45] Oct. 12, 1982

[54] EDUCATIONAL LEARNING AID

[76] Inventor: John A. Volakakis, 9810 S. Marion, Oak Lawn, Ill. 60453

[21] Appl. No.: 245,263

[22] Filed: Mar. 19, 1981

[51] Int. Cl.³ .............................................. G09B 1/08
[52] U.S. Cl. .................................... 434/168; 434/171
[58] Field of Search ............... 434/159, 168, 170, 171, 434/172, 208, 259, 160; 273/239; 40/596, 611

[56] References Cited

U.S. PATENT DOCUMENTS

| | | | |
|---|---|---|---|
| 2,551,831 | 5/1951 | Eaves | 40/611 X |
| 2,708,580 | 5/1955 | Hamilton | 273/239 X |
| 3,122,684 | 2/1964 | Genin | 434/168 UX |
| 3,280,499 | 10/1966 | Studen | 434/259 X |
| 3,746,343 | 7/1973 | Shapiro | 273/239 |
| 3,755,924 | 9/1973 | Langieri et al. | 434/208 |
| 3,811,206 | 5/1974 | Gaccetta | 434/159 |
| 3,853,321 | 12/1974 | Claffie | 273/239 |
| 3,999,761 | 12/1976 | Daniels | 273/295 |
| 4,286,952 | 9/1981 | Roche | 434/259 |

FOREIGN PATENT DOCUMENTS 221481 8/1942 Switzerland ........................ 40/596
700095 11/1953 United Kingdom ............... 434/160

Primary Examiner—Harland S. Skogquist
Attorney, Agent, or Firm—Edward D. Gilhooly

[57] ABSTRACT

An educational learning aid for teaching children the letters of the alphabet, numbers and other symbols in their proper sequence. The educational learning aid includes a plastic face cover having openings conforming to the shape of the letters, numbers and the like. A metallic backing plate, on which indicia may be applied to create better visualization of the openings in the face cover, is coupled beneath the cover plates. A plurality of separate pieces in the form of letters or numbers conforming to the array of the openings in the plastic cover are provided to permit insertion by a child. The letters include a magnetic element to effect attachment of an individual piece to the metallic backing plate when placed in its proper position.

5 Claims, 10 Drawing Figures

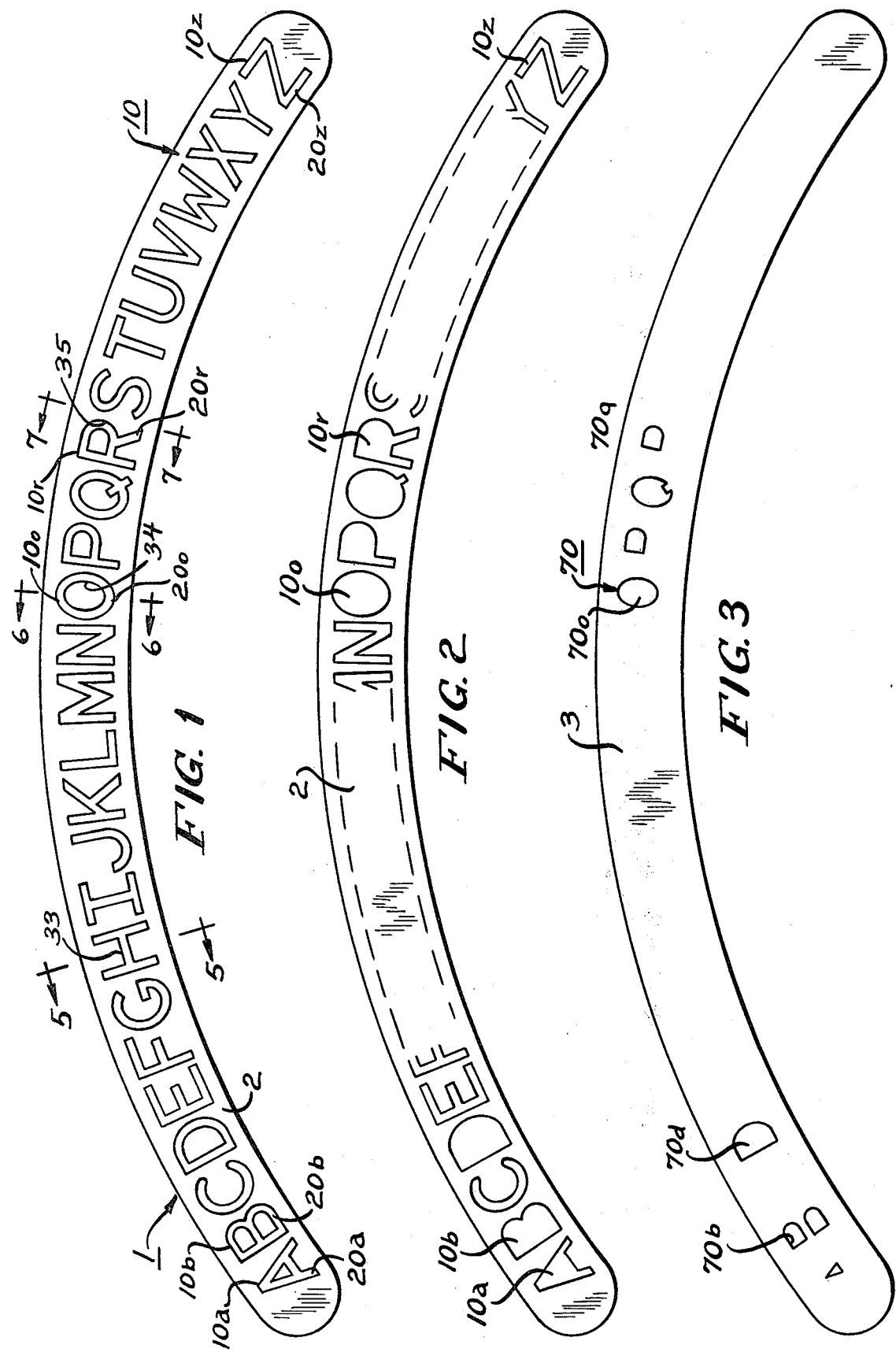

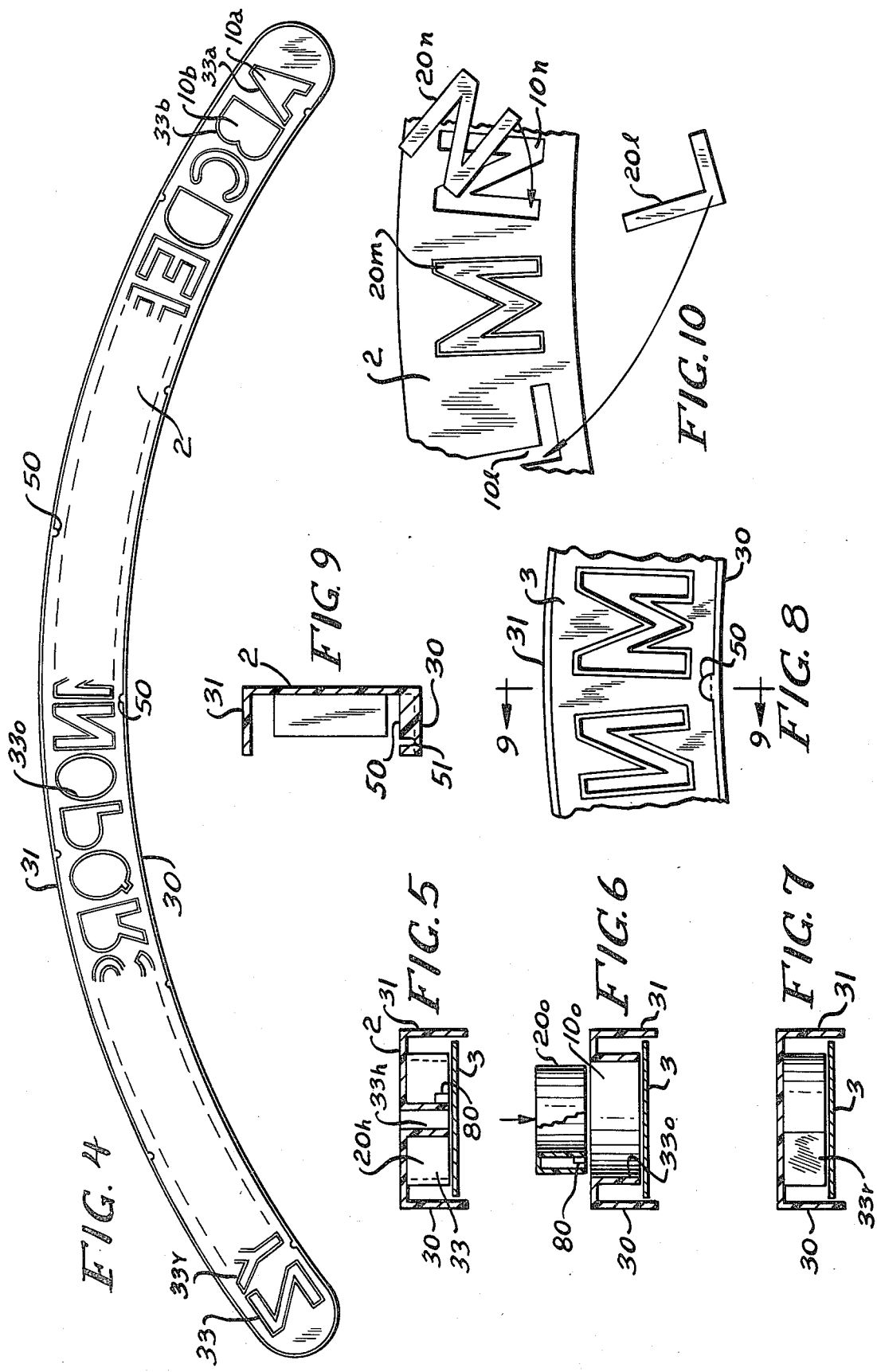

EDUCATIONAL LEARNING AID

BACKGROUND OF THE INVENTION

This invention relates in general to educational devices and, in particular, to an educational aid for the teaching children the alphabet, numerical system and the like.

More specifically, but without restriction to the particular use which is shown and described, the invention relates to an educational learning aid having means to permit children to learn the alphabet or sequence of numbers in their proper chain order in an effective manner. The invention of the application includes a board-like housing having a plurality of openings in which a magnetized conforming letter or number may be inserted for education and enjoyment of the child.

In the past, countless techniques have been employed to teach children the alphabet, the numerical system and the like. It is advantageous for the child during his or her initial learning phase to learn the alphabet in its proper chain order of letters for an optimum understanding. It is common for the young to be taught the alphabet through sheer memorization, without any visual or mental conception as to where each letter exists in relation to the other letters in their proper sequence or order. Many of the prior art educational devices have attempted to display the alphabet in a visual form not only to permit the learning of the alphabet, but to provide the user a visualization the letters. However, these known methods of teaching the alphabet have been deficient, because they have not allowed the child to learn the alphabet in its proper chain, or in a manner to maintain his or her interest, the latter being an important objective for younger children.

One type of known alphabet learning system is disclosed in U.S. Pat. No. 3,010,228 to Torre. In the Torre patent, the letters of the alphabet are arranged in their proper order on a board, and the letters can only be attached through alignment of magnets in the letter at its corresponding proper position. Such a teaching panel, as disclosed in the Torre patent, is ineffective in inducing the child to learn the alphabet in proper sequence, because of the relative complexity and difficulty of using the system. The letters of the alphabet of Torre only appear as squares before placement of the letter and thus do not provide any visualization of the letters to aid the young in their placement. Thus, the use of a complicated system, such as shown in the prior art Torre patent, only creates frustration in the child without encouraging him to place the letters in the proper sequence for superior learning results.

SUMMARY OF THE INVENTION

It is, therefore, an object of this invention to improve the teaching of letters, numbers and symbols to a child.

Another object of this invention is to teach the proper sequence of symbols in the form of letters, numbers and the like to the child in their proper chain order.

It is a further object of this invention to permit a child to visualize the position of a particular letter prior to the insertion of a corresponding part.

Still another object of this invention is to provide an educational teaching aid which encourages the child to learn the alphabet, a set of numbers and the like.

These and other objects are attained in accordance with the present invention wherein there is provided an improved educational teaching aid having an array of openings through a cover, such that a corresponding piece can be inserted therein. The symbols, which are outlined by the openings in the plastic cover, may be in the form of the alphabet in its proper sequence of order, a set of numbers or any other symbols, which are desirable to be learned in a prescribed chain. Each of the corresponding parts or pieces, which are insertable within the openings of the cover, include magnetic means for adherence to a metal plate which is situated behind the cover. The metal plate is provided with indicia to be disposed immediately below the opening to create a better visualization of the letters prior to insertion of the individual pieces therein. The education aid of the invention is easy to use and inexpensive to manufacture, and attains highly satisfactory learning experiences when used by children.

DESCRIPTION OF THE DRAWINGS

Further objects of the invention, together with additional features contributing thereto and advantages accruing therefrom, will be apparent from the following description of a preferred embodiment of the invention, which is shown in the accompanying drawings with like reference numerals indicating corresponding parts throughout, wherein:

FIG. 1 is a front schematic illustration of the assembled educational learning aid of the invention;

FIG. 2 is a front schematic view of the plastic face cover of the education learning aid of FIG. 1;

FIG. 3 is a front schematic view of the backing plate of the educational learning aid of FIG. 1;

FIG. 4 is a schematic rear view of the plastic face cover of the educational learning aid of FIG. 1;

FIG. 5 is an end sectional view of the educational learning aid of FIG. 1 taken along letter lines 5—5 through letter "H" thereof;

FIG. 6 is a sectional end view along lines 6—6 of FIG. 1 through the letter "O" illustrating a piece or letter being inserted therein;

FIG. 7 is an end sectional view taken along lines 7—7 of FIG. 1 between adjacent letters therein;

FIG. 8 is a partial enlarged bottom view of the plastic face cover of the invention illustrating a backing plate retention post of the invention;

FIG. 9 is an end sectional view taken along lines 9—9 of FIG. 8; and

FIG. 10 is a partial front schematic view of the educational learning aid of the invention illustrating the insertion of letters or pieces therein.

DESCRIPTION OF THE PREFERRED EMBODIMENT

Referring now to FIG. 1, there is illustrated an embodiment of the improved educational learning aid of the invention, generally designated by reference numeral 1. The educational learning aid 1 is comprised of a unitary cover member 2 formed of a molded plastic and the like, and a metal backing plate 3 positioned beneath the cover plate and best illustrated in FIG. 3. Although the cover plate may be constructed as a straight piece, it is desirable that the cover plate 2 and face metal sheet 3 be formed in an arcuate or curved configuration for better viewing by a child. The cover plate 2 is shown having a plurality of openings or spaces 10 outlining the letters of the alphabet in their correct proper sequence as best shown in FIGS. 1 and 2. It is within the scope of the invention, however, to provide other configurations of openings through the face of the cover plate, such as numbers or other symbols which are desirable to learn, recognize and recall in a particular chain order.

As best shown in FIG. 2, the outline of the letters are provided through the face of the cover plate and form a plurality of openings 10 outlining the particular letter of the alphabet in a manner to be described. For ease of illustration, each of the letters of the alphabet, i.e., A–Z, correspond to openings 10a, 10b . . . 10z as designated on the drawings. In the assembled form of the aid 1, a plurality of separate letters or pieces 20 also having a specific configuration 20a, 20b . . . 20z to correspond to each of the openings 10a, 10b, 10z, are inserted within the openings in the assembled form of the education aid 2 as shown in FIG. 1. The pieces 10 may be constructed from any suitable material, such as, for example, a plastic, metal, rigid paper, and the like.

As shown in FIGS. 4 to 7, the cover plate 2 includes a pair of integral side walls 30, 31 which extend downward from the face of the cover in which the openings 10 are situated. The letter openings 10a, 10b, . . . 10z are defined by a plurality of downward extending flanges 33 which are situated adjacent the openings 10 and hence the respective letter formed thereby. For ease of understanding, the flanges 33 are designated in FIGS. 4, 5, 6 and 7 as flanges 33a, 33b, . . . 33z, dependent on the particular letter at which the flange 30 is situated and form a portion of a compartment beneath each opening for receiving letter pieces 20. A representative illustration of the outline of particular letters is shown in FIGS. 5 and 6, illustrating a cross-sectional view through the letter "H" and through the letter "O" in FIG. 1. In FIG. 5, the arrangement of the downwardly extended flange 33h is shown depicting the formation of the letter "H" and for receiving the individual letter 20H to be inserted therein. Similarly, in FIG. 6, the circular outline of flange 33o, forming the opening through the cover plate, is illustrated with the individual letter 20o being inserted therein through the opening 10o created. Similarly, in FIG. 7, a sectional view behind the letter "R" is shown illustrating the outline of the letter formed by flange 33o. It should be apparent that the other letters are similarly formed by downward extending flanges 30 surrounding and otherwise defining the outline of each of the letters A to Z.

Referring to FIGS. 8 and 9, the means to secure the backing plate 3 to the cover plate 2 is illustrated. An integral post 50 is formed alternately along the extent of outer flanges 30 and 31 of the cover plate. The post 50 is formed with a notch 51 in which the periphery of the metallic backing plate 3 may be removably inserted in use as shown in FIG. 8. The plate 3 may be easily removed to make the placement of letters more difficult at advance stages of the development and learning of the child to the alphabet. When in place, backing plate 3 aids placement of the letters 20a, 20b . . . 20c, by being provided with indicia 70, such as 70b, 70d . . . 70z to create an outline of the letter beneath each of the openings 10 and provide the child with greater visualization of the letter in which pieces 20 are to be inserted. Thus, by removing the backing plate 3, such visualization is not present and insertion of letters into their proper position is more difficult for advanced learning of the alphabet.

Referring now to FIG. 10, the general placement of the letters 20 into respective openings 10 is shown. The letter 20m is illustrated in proper position within the opening 10m of the cover plate 2. The letter 20l is shown being inserted into the space opening 10l, while the letter 20n is being inserted into the opening 10n. Securement of individual pieces or letters 20a, 20b, 20c . . . 20z within an opening 10 may be attained by the use of one or more magnets 80 which are suitably affixed to the letter at any position, preferably concealed, to enable the letter to be attracted to the metal backing plate for adherence thereto.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An educational aid assembly comprising:
cover means having an upper face,
said face having a plurality of openings therethrough and defining a respective symbol in a predetermined order, said openings adapted to receive a separate piece corresponding to said respective symbols,
a plurality of pieces corresponding to the configuration of said openings for respective insertion therein,
flange means integrally attached to said cover means beneath said face,
said flange means having a downwardly disposed surface arranged immediately adjacent said opening and defining at least a portion of said opening beneath said face,
backing means detachably coupled to said cover means and positioned beneath said plurality of openings,
said face is in the form of an elongated surface having an arcuate configuration, and
said backing means includes indicia situated beneath each of said plurality of openings outlining the shape thereof to provide enhanced visualization of said respective symbols.

2. The educational aid assembly according to claim 1 wherein said plurality of openings outline the shape of the letters of the alphabet in proper order.

3. The educational aid assembly according to claim 1 wherein said cover means includes post means detachably supporting said backing means.

4. The educational aid assembly according to claim 3 wherein said backing means is detachably supported with a notch within said post means.

5. The educational aid assembly according to claim 4 wherein said post means includes a plurality of posts having a respective notch for detachably receiving said backing means.

* * * * *